US007733039B2

(12) United States Patent
Su (10) Patent No.: US 7,733,039 B2
(45) Date of Patent: Jun. 8, 2010

(54) ELECTRIC VEHICLE SYSTEM FOR CHARGING AND SUPPLYING ELECTRICAL POWER

(75) Inventor: Gui Jia Su, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 150 days.

(21) Appl. No.: 11/859,006

(22) Filed: Sep. 21, 2007

(65) Prior Publication Data

US 2008/0094013 A1    Apr. 24, 2008

Related U.S. Application Data

(60) Provisional application No. 60/862,118, filed on Oct. 19, 2006.

(51) Int. Cl.
*H02P 3/00* (2006.01)
*H02P 5/00* (2006.01)

(52) U.S. Cl. ............... 318/139; 318/400.09; 180/65.1; 180/65.21; 180/65.51; 180/65.6

(58) Field of Classification Search ............... 318/139, 318/400.09; 180/65.1, 65.21, 65.51, 65.6
See application file for complete search history.

(56) References Cited

U.S. PATENT DOCUMENTS

| | | | |
|---|---|---|---|
| 4,678,981 A | 7/1987 | Murray | |
| 5,589,743 A | 12/1996 | King | |
| 5,635,804 A | 6/1997 | Tanaka et al. | |
| 5,705,902 A | 1/1998 | Merritt et al. | |

(Continued)

FOREIGN PATENT DOCUMENTS

EP    0 828 304 A2    3/1998

(Continued)

OTHER PUBLICATIONS

Kempton, W. et al., "Vehicle-to-Grid Power: Battery, Hybrid, and Fuel Cell Vehicles as Resources for Distributed Electric Power in California," Report No. UCD-ITS-RR-01-03, prepared for California Air Resources Board and the California Environmental Protection Agency, Jun. 2001.

*Primary Examiner*—Walter Benson
*Assistant Examiner*—Erick Glass
(74) *Attorney, Agent, or Firm*—Novak Druce + Quigg LLP; Gregory A. Nelson (57) ABSTRACT

A power system that provides power between an energy storage device, an external charging-source/load, an onboard electrical power generator, and a vehicle drive shaft. The power system has at least one energy storage device electrically connected across a dc bus, at least one filter capacitor leg having at least one filter capacitor electrically connected across the dc bus, at least one power inverter/converter electrically connected across the dc bus, and at least one multiphase motor/generator having stator windings electrically connected at one end to form a neutral point and electrically connected on the other end to one of the power inverter/converters. A charging-sourcing selection socket is electrically connected to the neutral points and the external charging-source/load. At least one electronics controller is electrically connected to the charging-sourcing selection socket and at least one power inverter/converter. The switch legs in each of the inverter/converters selected by the charging-source/load socket collectively function as a single switch leg. The motor/generators function as an inductor.

9 Claims, 9 Drawing Sheets

U.S. PATENT DOCUMENTS

| | | | |
|---|---|---|---|
| 5,780,980 A | 7/1998 | Naito | |
| 5,926,004 A | 7/1999 | Henze | |
| 6,507,500 B2 | 1/2003 | Liang | |
| 6,683,389 B2 * | 1/2004 | Geis | 290/40 C |
| 2002/0132144 A1 | 9/2002 | McArthur et al. | |
| 2004/0062059 A1 | 4/2004 | Cheng et al. | |
| 2007/0012492 A1 * | 1/2007 | Deng et al. | 180/65.1 |
| 2008/0215200 A1 * | 9/2008 | Toth | 701/22 |
| 2008/0270023 A1 * | 10/2008 | Kumar | 701/207 |

FOREIGN PATENT DOCUMENTS

| | | |
|---|---|---|
| FR | 2738411 | 3/1997 |
| JP | 6-276616 | 9/1994 |
| JP | 07039014 | 2/1995 |
| JP | 07046713 | 2/1995 |
| JP | 08214413 | 8/1996 |
| JP | 09103002 | 4/1997 |
| JP | 11075323 | 3/1999 |
| JP | 110205908 | 7/1999 |
| JP | 11215609 | 8/1999 |
| JP | 11285105 | 10/1999 |
| JP | 2000102177 | 4/2000 |
| JP | 2000232737 | 8/2000 |
| JP | 2000354331 | 12/2000 |
| JP | 2002134125 | 5/2002 |
| JP | 2002165370 | 6/2002 |

\* cited by examiner

ELECTRIC VEHICLE SYSTEM FOR CHARGING AND SUPPLYING ELECTRICAL POWER

CROSS-REFERENCE TO RELATED APPLICATIONS

This application claims priority from U.S. Provisional Patent Application 60/862,118 filed Oct. 19, 2006, herein incorporated by reference.

STATEMENT REGARDING FEDERALLY SPONSORED RESEARCH

This invention was made with United States Government support under Contract No. DE-AC05-00OR22725 between the United States Department of Energy and U.T. Battelle, LLC. The United States Government has certain rights in this invention.

BACKGROUND OF THE INVENTION

The use of electric vehicles (EVs) has been promoted in recent years to reduce oil consumption and the emissions of harmful pollutants and carbon dioxide. EVs may include battery powered vehicles, fuel cell powered vehicles, and hybrid electric vehicles (HEVs). Commercially available HEVs employ a battery and an electrical motor that are sized to optimize the energy efficiency of an internal combustion engine and to capture a portion of the kinetic energy for later use through dynamic braking by the motor during deceleration. As such, the batteries can only provide a very limited driving distance (a few miles) in the electrical only mode, in which the engine is not used. On the other hand, plug-in hybrids use a substantially larger battery to enable a driving distance of 20 to 60 miles for normal commuting in the all-electric mode after fully charged. To avoid fuel consumption and air pollutions by operating the engine, the battery is fully charged by a standalone external charger powered by the utility grid and the charging is done preferably overnight to leverage energy costs by taking advantage of off-peak electricity rates. Plug-in hybrids thus offer a greater potential than those hybrid vehicles currently available on the market to reduce oil consumption and the emissions of pollutants and carbon dioxide.

HEVs can have a variety of electrical motor drive systems and use different coupling mechanisms to combine the propulsion forces from an engine and the electrical motor(s) to drive the wheels. An electrical motor drive system may include an energy storage device and one or more drive units. A drive unit typically consists of a power inverter/converter and a motor, in which the inverter/converter either functions as an inverter to convert a dc voltage to an ac voltage suitable to operate the motor, or a converter when the motor is operating in power generation mode. Multiple electrical drive units can be used to provide four-wheel drive capabilities.

Figure 1:
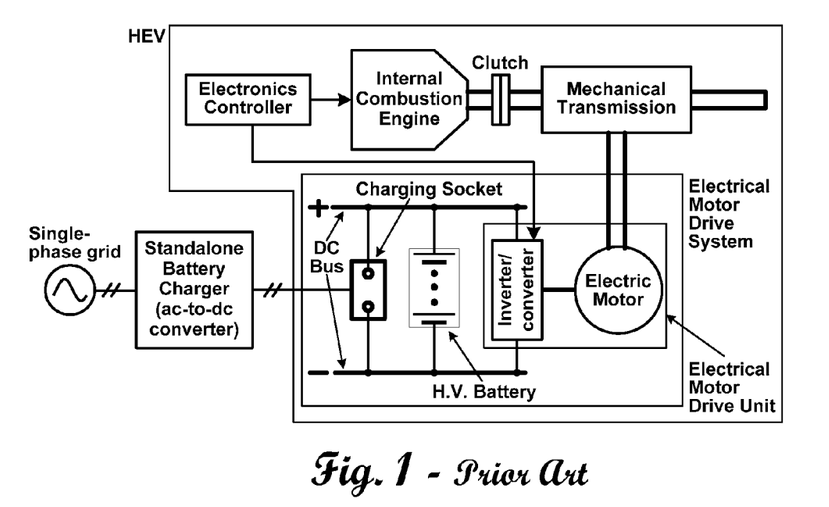
FIG. 1 is a schematic for a prior art charging system.

As an example, FIG. 1 illustrates a simplified block diagram of a parallel configuration HEV. It employs a single motor drive unit, whose electric motor is connected to the engine shaft through a mechanical transmission and works in parallel with the engine to provide propulsion force to the wheels (not shown in the figure) of the vehicle. The vehicle can be propelled by the engine alone, by the electrical motor alone (all-electric mode), or by both (hybrid mode). The electric motor, controlled by a power inverter/converter and powered by a high voltage (H.V.) battery, can provide the sole driving force in the all-electric mode, where the engine is disconnected from the transmission by the clutch. Or in hybrid mode, the motor handles the variations in the driving force demand to optimize the fuel efficiency of the engine. The motor is also used to start the engine and to charge the H.V. battery when needed during vehicle operations. For charging the battery, the motor functions as a generator driven by the engine or by the vehicle inertia during deceleration and produces an ac voltage, which is converted to dc by the power converter to supply the H.V. dc bus. An electronic controller based on one or more microprocessors is used to control the operations of the engine and electrical motor drive system.

It is desirable to have a large capacity battery being able to store energy enough to power the HEV for a driving distance long enough for a typical daily commuting without using the engine at all, and to be able to charge the battery by plugging into the grid through the charging socket. Traditionally this is accomplished by using a standalone battery charger, typically consisting of an inductor, a rectifier and a dc-to-dc converter to regulate a dc voltage across the dc bus for charging the battery. The standalone charger may be assembled into a single unit installed onboard or off-board the vehicle. Or it may be constructed into two pieces by separating the primary and secondary magnetic cores and windings of a transformer (as disclosed in U.S. Pat. Nos. 5,264,776 and 5,463,303) with one onboard and the other off-board the vehicle. When the two pieces are brought together power can be transferred from the ac source to the battery across the transformer.

An onboard battery charger can also be realized by using the electrical drive inverter and motor in an HEV. In a disclosure (Japanese patent P2000-232737A), a charging device was disclosed, which uses two additional diodes and the electrical motor and inverter to charge the battery from the utility grid. This device, however, cannot operate as a power source to supply external loads.

It is also desirable to make EVs/HEVs to be able to function as mobile electrical power generators for emergency and other uses. While battery-engine hybrids may be suitable for emergency needs, fuel cell powered vehicles may even be suited for regular uses because fuel cells do not generate air-polluting by-products. In a disclosure (US 2004/0062059 A1), an apparatus and method was disclosed to charge a battery in a fuel cell powered inverter-motor drive system or to make the drive system an electrical power source. It employs two switches to selectively couple a three-phase inverter to an electrical motor for operating the motor or to an ac power source through an additional inductor/filter for charging the battery with or without an optional "boosting circuit".

It is now desirable to eliminate or minimize the number of additional components by integrating the battery charging function into the electrical motor drive systems to minimize the cost. The present invention presents hybrid electric vehicle systems and methods for battery charging and/or supplying electrical power to external loads. It is done by utilizing only the already onboard inverter(s) and motor(s) without adding any inductors or switches. Therefore, the present invention can fulfill all the requirements while not incurring any additional cost.

BRIEF DESCRIPTION OF THE INVENTION

This invention teaches power systems for charging energy storage devices such as batteries in hybrid electric and electric vehicles (HEV/EV) from an external power source and/or for enabling EVs/HEVs to supply electrical power to external loads. The invention can eliminate the need for a standalone external charger in plug-in HEV applications as well enable EVs/HEVs to function as an electrical power source by utilizing the on-board inverter(s) and electric motor(s) without adding any additional components.

One embodiment of the invention is a power system that provides power between an energy storage device, an external charging-source/load, an onboard electrical power generator, and a vehicle drive shaft. The power system has at least one energy storage device electrically connected across a dc bus, at least one filter capacitor leg having at least one filter capacitor electrically connected across the dc bus, at least one power inverter/converter electrically connected across the dc bus, and at least one multiphase motor/generator having stator windings electrically connected at one end to form a neutral point and electrically connected on the other end to one of the power inverter/converters. A charging-sourcing selection socket is electrically connected to the neutral points and the external charging-source/load. At least one electronics controller is electrically connected to the charging-sourcing selection socket and at least one power inverter/converter. The switch legs in each of the inverter/converters selected by the charging-source/load socket collectively function as a single switch leg. The motor/generators function as an inductor.

BRIEF DESCRIPTION OF THE DRAWINGS

FIG. 6b is a schematic for an equivalent circuit of FIG. 6a.

DETAILED DESCRIPTION OF THE INVENTION

Figure 2:
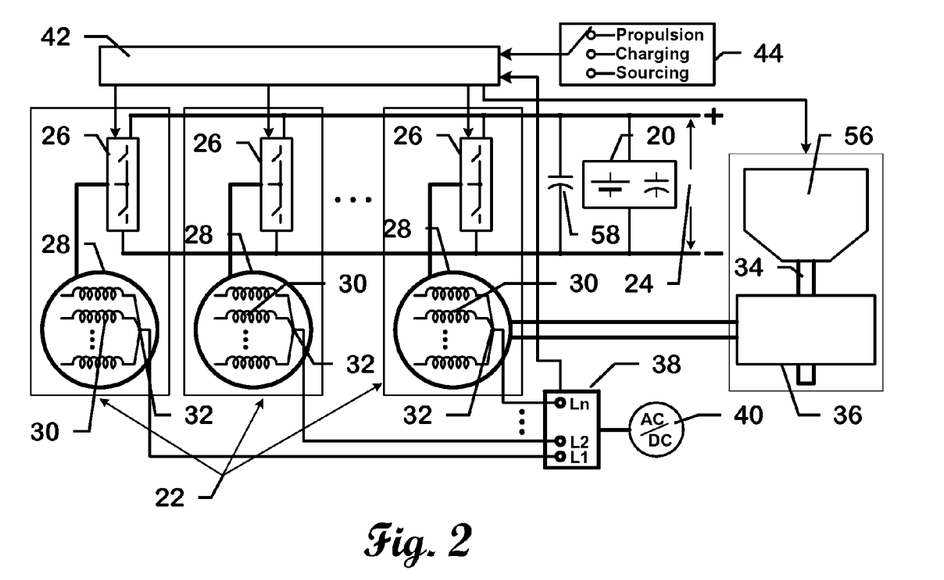
FIG. 2 is a schematic for a first embodiment of the power system using an internal combustion engine.

FIG. 2 shows a first embodiment of an electrical drive system in HEVs. It is comprised of energy storage devices 20 such as batteries and ultra-capacitors, a filter capacitor 58, and multiple electrical motor drive units 22, all connected to a common dc bus 24. Each motor drive unit 22 employs an inverter/converter 26 (INV/CONV) and a multiphase motor/generator 28 (MG), whose stator windings 30 are bundled together at one end to from a neutral point 32 (NMG) while the other ends are connected to the inverter/converter 26. At least one drive unit 22 is coupled to the engine shaft 34 through a mechanical transmission device 36. The neutral points 22 of the motors/generators 28 are brought out to a phase number selection socket 38; each neutral point 32 is connected to a pin in the socket 38. The socket is used to selectively connect an external charging source 40 for charging the energy storage device 20, or external loads 40 for supplying power to the external loads 40, through some or all of the drive units 22, depending on the number of the phases of the charging source or the loads. The external charging source 40 can be a dc, single or multiphase ac power supply. Similarly, the external loads 40 can be dc, single or multiphase ac loads or the utility grids. The selection socket 38 provides information to an electronics controller 42 on which of its pins are connected to the external charge source or loads. A mode selection switch 44 tells the electronics controller 42 to operate in one of the three modes: propulsion for driving the vehicle, charging the battery (charging mode) or supplying power to external loads (sourcing mode).

All the switch legs in each inverter/converter 26 selected by the socket 38 will collectively function as a single switch leg and the motor/generator 28 as an inductor, as will be explained in detail in the following sections. Together, the selected drive units 22 form a single-phase or multiphase converter, when operating in the charging mode, to regulate the dc bus voltage. Dc is a special case of single-phase ac.

When operating in the sourcing mode, the selected drive units 22 form a single or multiphase inverter to supply external loads 40. In this mode, the motor/generator 28 of the drive unit 22 coupled to the engine shaft 34 is driven by an internal combustion engine 56 to generate power for supplying the dc bus 24 and ultimately the external loads 40.

Figure 3:
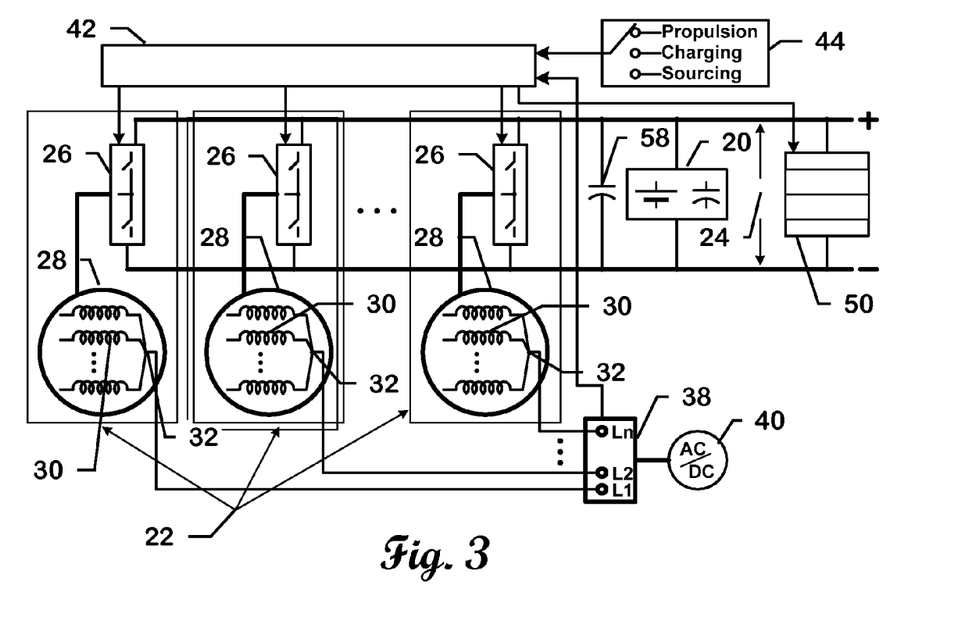
FIG. 3 is a schematic for a second embodiment of the power system using fuel cells.

FIG. 3 shows a second embodiment of an electrical drive system in fuel cell 50 powered vehicles.

Figure 4:
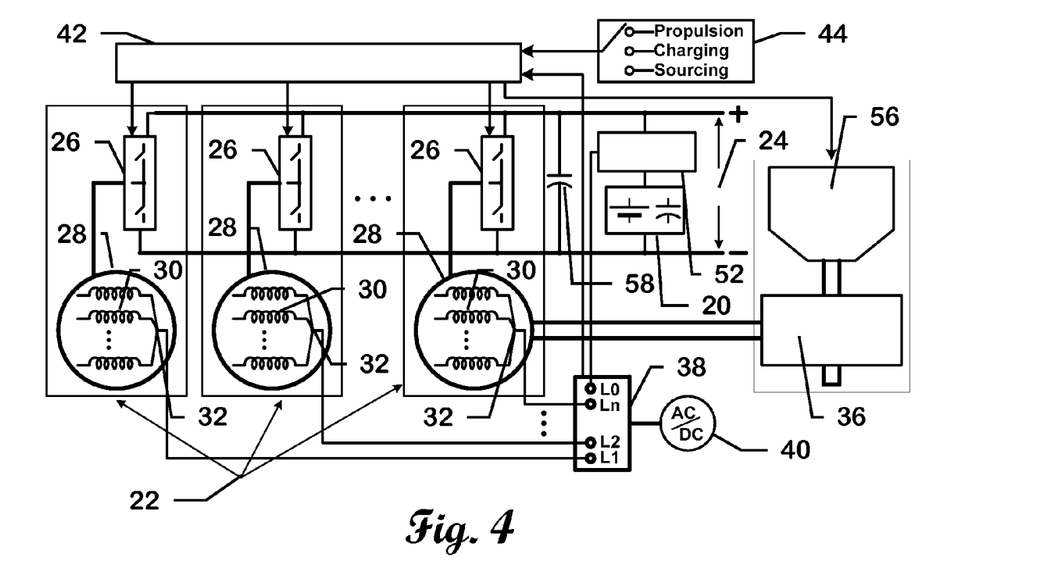
FIG. 4 is a schematic for a third embodiment of the power system using a bidirectional dc-to-dc converter.
Figure 5:
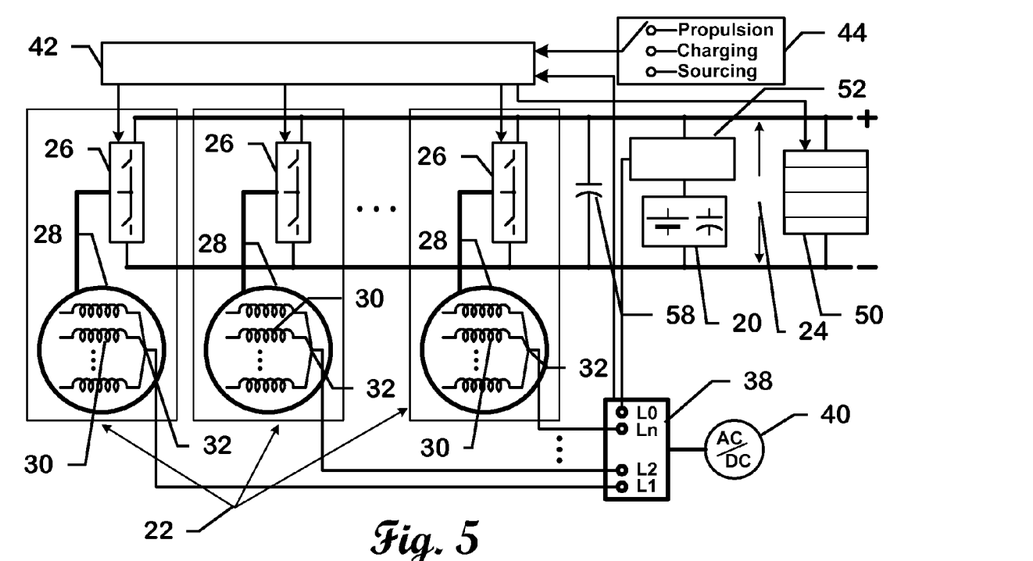
FIG. 5 is a schematic for a fourth embodiment of the power system using a fuel cell and bidirectional dc-to-dc converter.

FIGS. 4 and 5 show two embodiments that are constructed by adding of a bidirectional dc-to-dc converter 52 into FIGS. 2 and 3, respectively, for interfacing the storage device 20 to the dc bus 24. With the assistance of the dc-to-dc converter 52, the storage device 20 is decoupled from the dc bus 24 of high voltage and can operate at much lower voltage levels. Lower voltages batteries and ultra-capacitors are preferable because of higher reliability. The dc-to-dc converter also helps in maintain a fixed dc bus voltage desirable for controlling the motors/generators while extending the operating voltage range of the energy storage device.

Figure 6A:
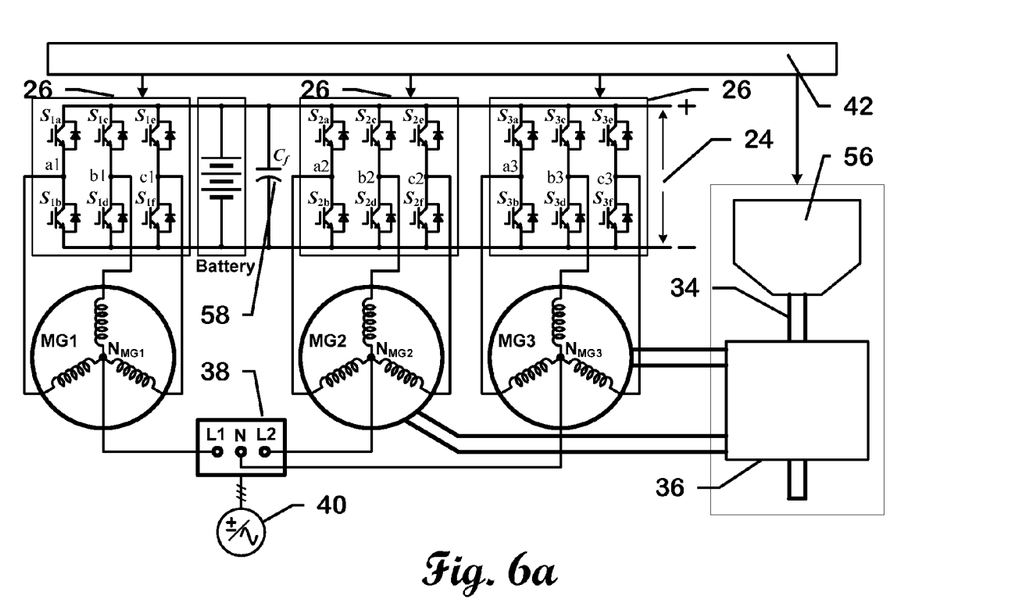
FIG. 6a is a schematic for a fifth embodiment of the power system using star connected motors for four-wheel drive capability.

FIG. 6(a) shows one preferred configuration of the first embodiment in FIG. 2 to provide four-wheel drive capability. It is comprised of a battery, and a dc bus filter capacitor ($C_f$) 58 and three electrical motor drive units, all connected to a common dc bus. Each motor drive unit employs a three-phase inverter/converter (INV/CONV) and a three-phase motor/generator (MG1, MG2 and MG3), whose stator windings are wired in a star connection. The neutral points of the motors/generators are brought out to a charging/sourcing socket. The external charging source can be a dc, or single-phase or three-phase ac power supply. Similarly, the external loads can be dc, single-phase or three-phase ac loads or the utility grids. Motors/generators MG2 and MG3 are mechanically connected to the front drive shaft through a transmission device 36 such as a planetary gear and Motor/generator MG1 is mechanically connected to a rear drive shaft (not shown in the figure).

Figure 6B:
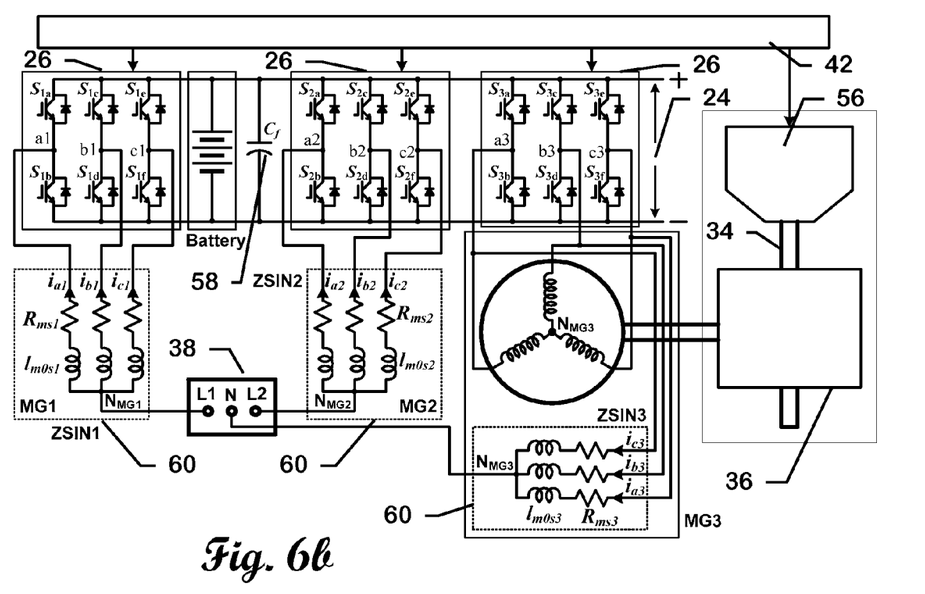

FIG. 6(b) shows an equivalent circuit of FIG. 6(a), where all the three switch-legs (a1, b1, c1 and a2, b2, c2) in each of the two inverters/converters, INV/CONV1 and INV/

CONV2, collectively function as a single switch leg and the motors/generators as two impedance networks—their stator zero sequence impedance networks 60 (ZSIN1 and ZSIN2). The INV/CONV2 may also function as a single switch with motor/generator MG3 acting as an impedance network (ZSIN3) in charging mode or as a three-phase inverter in sourcing mode with MG3 acting as a generator driven by the engine. Each of the ZSINs 60 consists of three branches and each branch is comprised of the stator winding phase resistance ($R_{ms1}$, $R_{ms2}$ or $R_{ms3}$) and the stator phase leakage inductance ($I_{m0s1}$, $I_{m0s2}$ or $I_{m0s3}$). Together, the selected drive units form a single-phase or three-phase converter, when operating in the charging mode, to regulate the dc bus voltage, or two single-phase inverters for supplying external loads.

Figure 7:
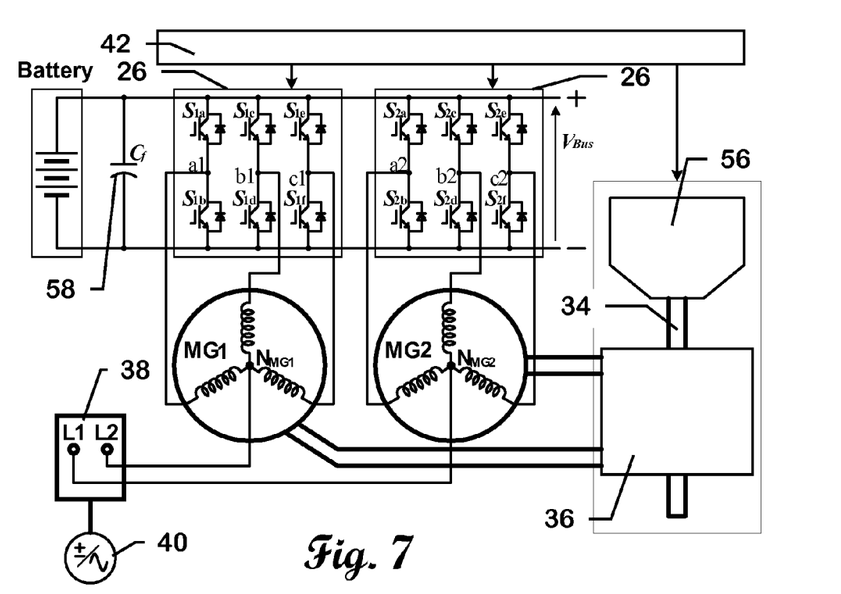
FIG. 7 is a schematic for a sixth embodiment of the power system.

FIG. 7 shows an alternative configuration of FIG. 6(a) for two wheel drive vehicles.

Figure 8:
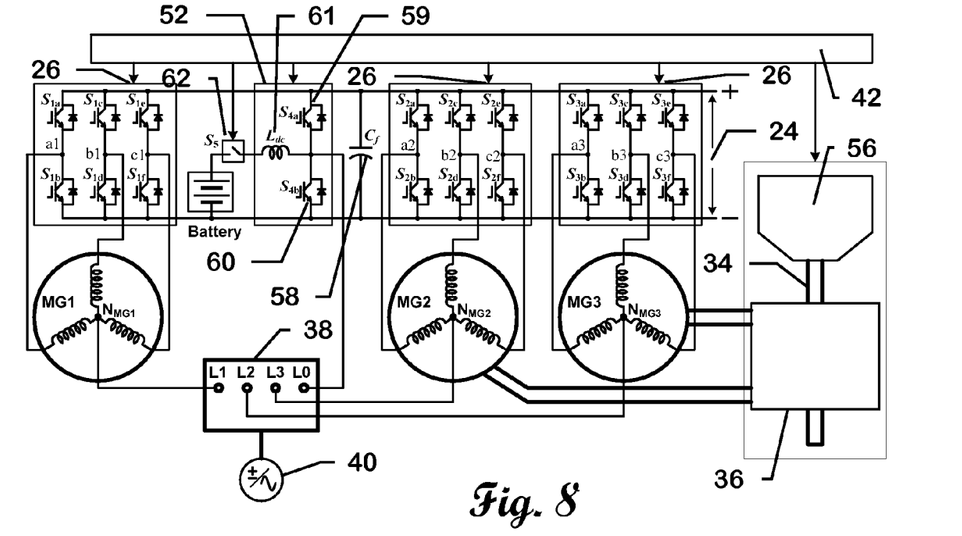
FIG. 8 is a schematic for a seventh embodiment of the power system.

FIG. 8 shows one preferred configuration of the third embodiment in FIG. 4 to provide four-wheel drive capability and to use a lower voltage energy storage device. It is comprised of a battery, a contact switch 62, a dc-dc converter 52, a dc bus filter capacitor ($C_f$) 58, and three electrical motor drive units. The dc-dc converter 52 and the three electrical motor drive units are connected to a common dc bus. Each motor drive unit employs a three-phase inverter/converter 26 and a three-phase motor/generator (MG1, MG2 and MG3), whose stator windings are wired in a star connection. The neutral points of the motors/generators are brought out to a charging/sourcing socket 38. The external charging source can be a dc, or single-phase or three-phase ac power supply. Similarly, the external loads can be dc, single-phase or three-phase ac loads or the utility grids. The dc-dc converter is comprised of two switches 59 and 60 connected in series and an inductor 61 with one terminal connected to the midpoint of the two switches and the other terminal connected to the contact switch 62. The battery is connected to the negative rail of the dc bus and the contact switch. Motors/generators MG2 and MG3 are mechanically connected to the front drive shaft through a transmission device 36 such as a planetary gear and Motor/generator MG1 is mechanically connected to a rear drive shaft (not shown in the figure). When charging the battery from an external source, the contact switch 62 is closed and a single-phase ac source (including dc) is connected to through a charging/sourcing socket any two of the electrical motor drive units or a three-phase ac source is connected to all the three electrical motor drive units. The inverters of the selected drive units operate as s single phase or three phase converter to converter the single phase ac or three phase ac voltages to a dc voltage appearing across the dc bus. The dc bus voltage is then reduced by the dc-dc converter to a level suitable to charge the battery. When operating as a power supply, the contact switch 56 is opened and Motor/generator MG3 is driven by an engine 56 to power the dc bus. A single-phase external load can be supplied by the two Motors/generators MG1 and MG2, or a combination of the dc-dc converter and one of the two Motors/generators MG1 and MG2. Or both the two Motors/generators MG1 and MG2 and the dc-dc converter are used to supply a three-phase load or a split single phase (120V/240V) load.

Figure 9:
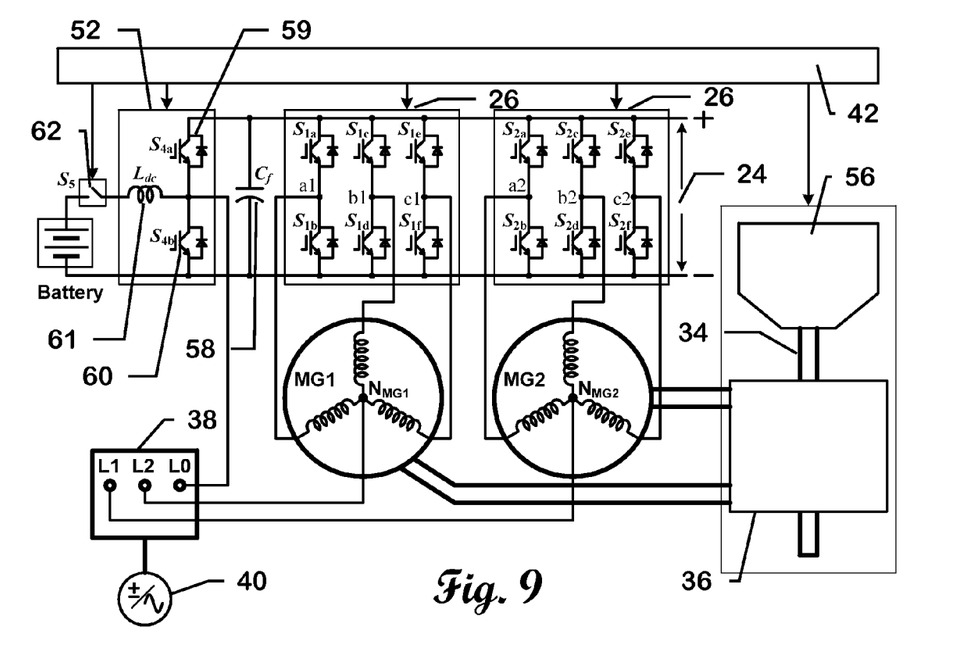
FIG. 9 is a schematic for an eighth embodiment of the power system.

FIG. 9 shows an alternative configuration of the embodiment in FIG. 7, where a dc-dc converter 52 is added to use a lower voltage battery.

Figure 10:
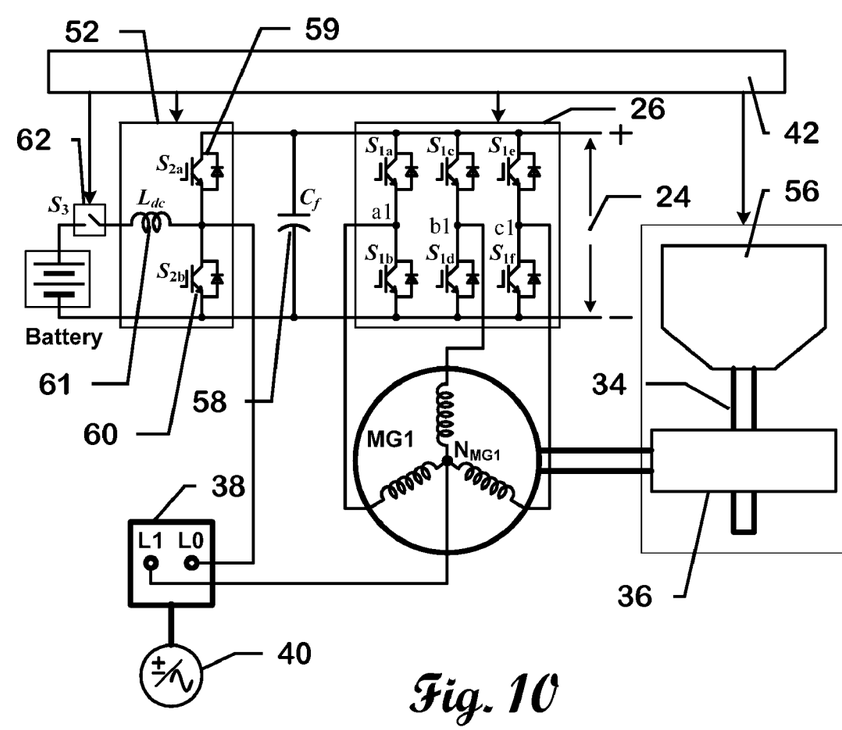
FIG. 10 is a schematic for a ninth embodiment of the power system.
Figure 11:
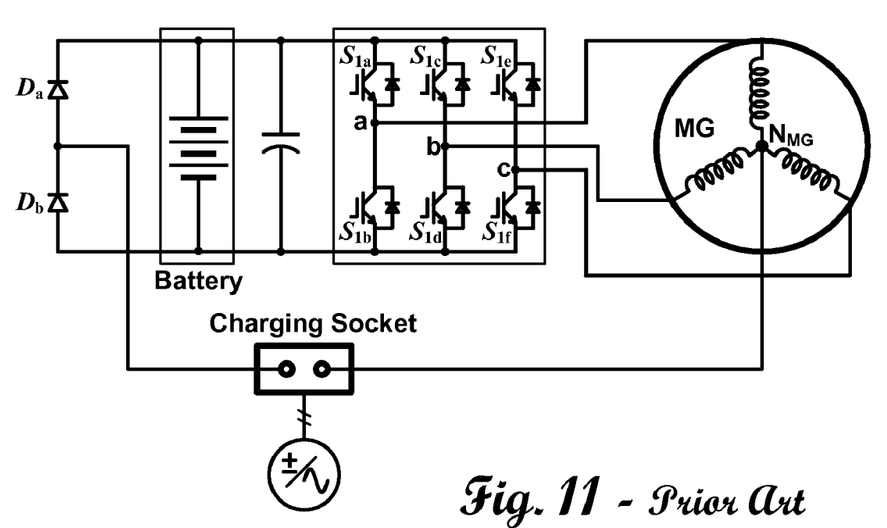
FIG. 11 shows a prior art charging system.

FIG. 10 shows an alternative configuration of the embodiment in FIG. 9, where only one electric motor drive unit is used. The dc-dc converter and inverter legs of the electrical drive unit operate as a single phase inverter to supply a single phase load or as single phase rectifier to charge the battery from an external single phase source connected through a charging/sourcing socket.

Figure 12:
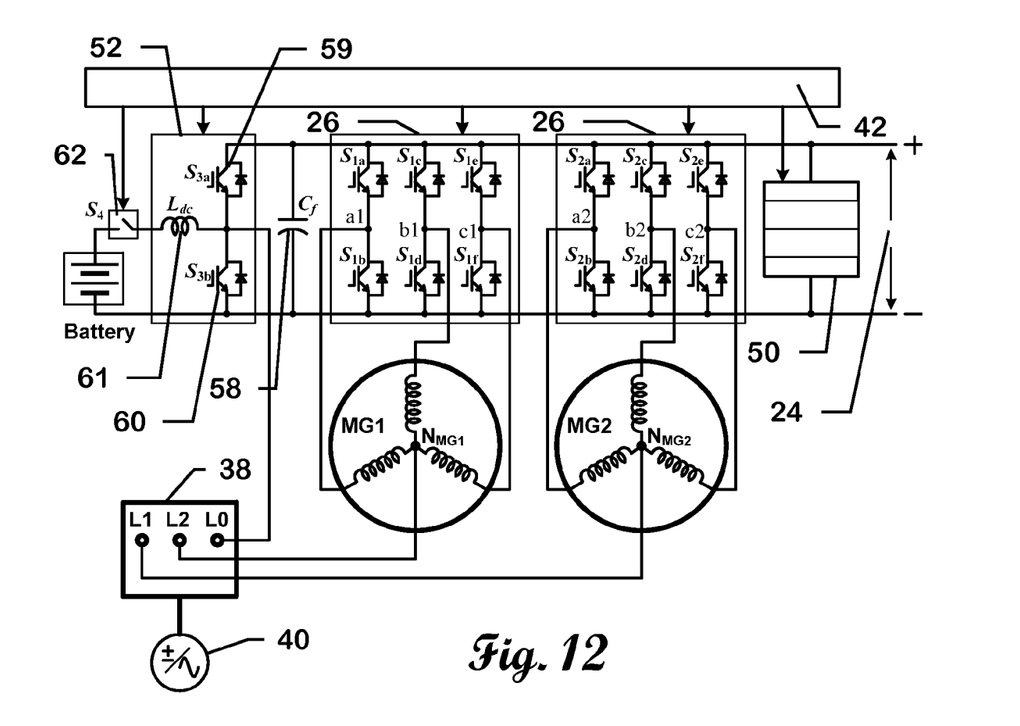
FIG. 12 is a schematic for a tenth embodiment of the power system.

FIG. 12 shows a configuration of the embodiment in FIG. 5 for a four wheel drive fuel cell powered vehicle. When charging the battery from an external source, the contact switch 62 is closed and a single-phase ac source (including dc) is connected to through a charging/sourcing socket 38 the electrical motor drive units, The inverters 26 of the two drive units operate as s single phase converter to converter the single phase ac voltage to a dc voltage appearing across the dc bus. The dc bus voltage is then reduced by the dc-dc converter to a level suitable to charge the battery. When operating as a power supply, the contact switch 62 is opened and the fuel cell 50 powers the dc bus 24. A single-phase external load can be supplied by the two Motors/generators, or a combination of the dc-dc converter 52 and one of the two Motors/generators MG1 and MG2. Or both the two Motors/generators MG1 and MG2 and the dc-dc converter are used to supply a three-phase load or a split single phase (120V/240V) load.

Figure 13:
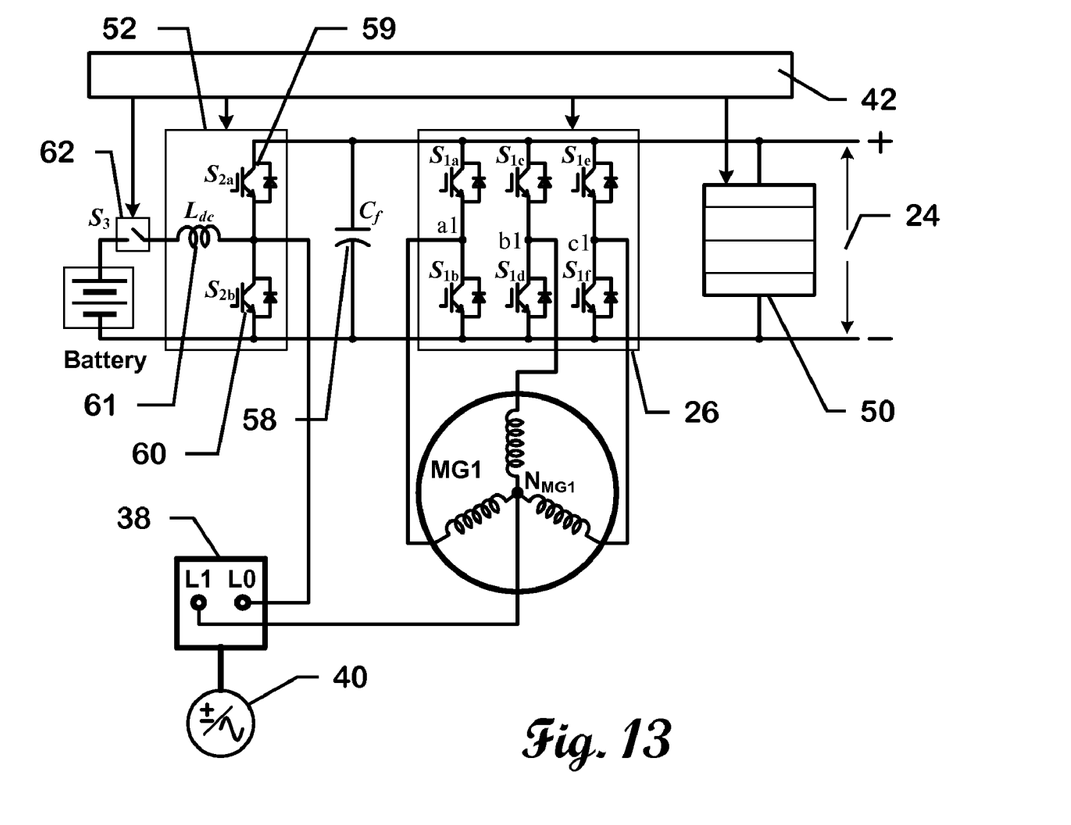
FIG. 13 is a schematic for an eleventh embodiment of the power system.

FIG. 13 shows an alternative configuration of the embodiment in FIG. 12 for two wheel drive fuel cell vehicles.

Figure 14:
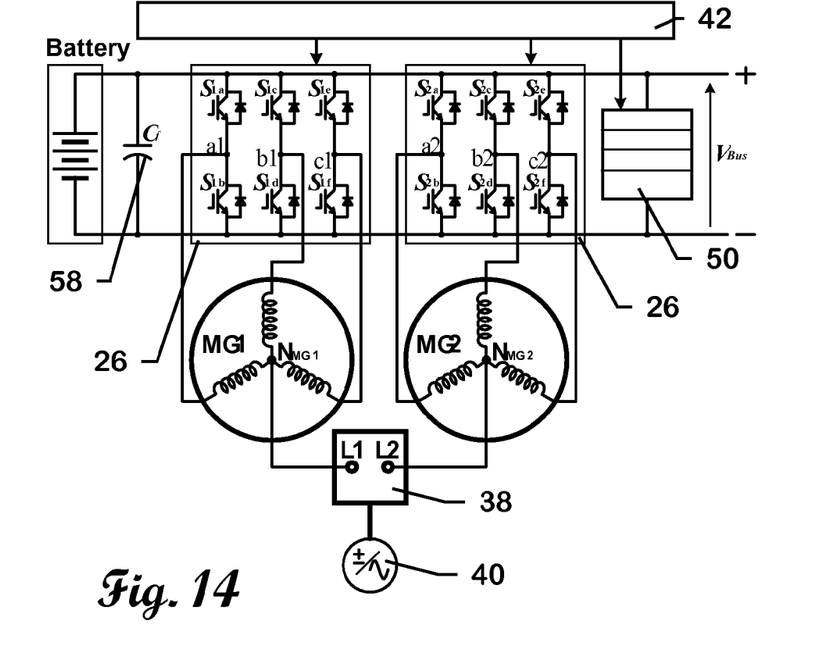
FIG. 14 is a schematic for a twelfth embodiment of the power system.

FIG. 14 shows an alternative configuration of the embodiment in FIG. 12 for four wheel drive fuel cell vehicles, where a high voltage battery is directly connected to the dc bus.

Figure 15:
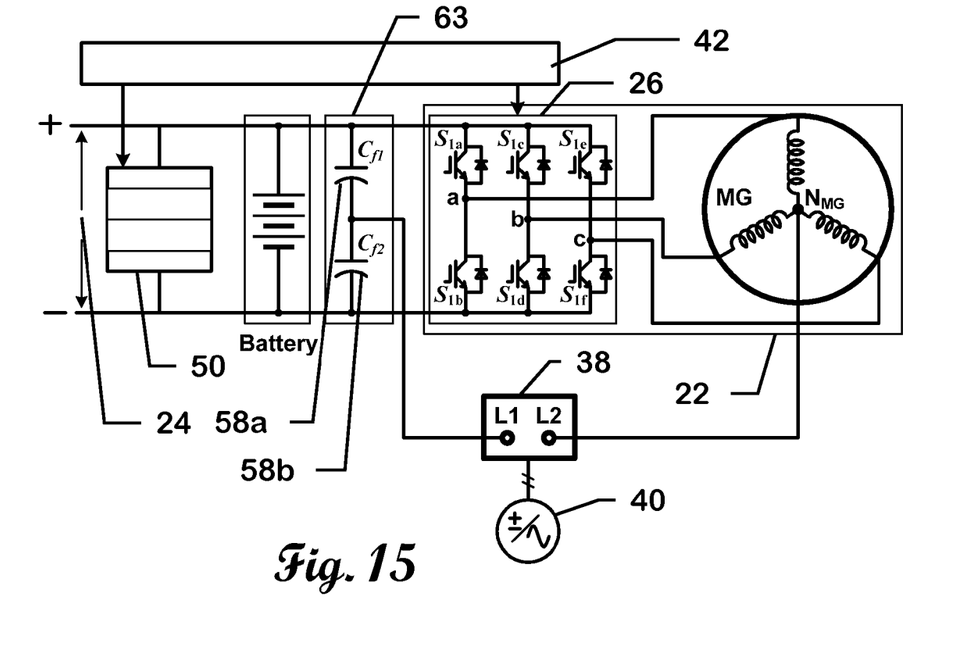
FIG. 15 is a schematic for a fourteenth embodiment of the power system.

FIG. 15 shows an alternative configuration for two wheel drive fuel cell vehicles. It comprises of a fuel cell stack 50, a battery, an electrical drive unit 22, and a capacitor leg 63 comprised of two capacitors 58a and 58b connected in series, all connected across a dc bus 24. The midpoint of the two capacitors is connected to a charging/sourcing socket 38. The capacitor leg 63 and the inverter 26 of the electrical drive unit operate as rectifier to charge the battery or a single phase inverter to supply power from the fuel cell to a single phase load connected at the charging/sourcing socket.

While there has been shown and described what are at present considered the preferred embodiments of the invention, it will be obvious to those skilled in the art that various changes and modifications can be made therein without departing from the scope.

I claim:

1. A power system to provide power between an energy storage device, an external charging source/load, an onboard electrical power generator, and a vehicle drive shaft, the power system comprising: at least one energy storage device electrically connected across a dc bus; at least one filter capacitor leg comprising at least one filter capacitor and electrically connected across said dc bus; at least one power inverter/converter electrically connected across said dc bus; at least one multiphase motor/generator, each motor/generator comprising stator windings electrically connected at one end to form a neutral point and electrically connected on the other end to one of said power inverter/converters; a charging-sourcing selection socket electrically connected to said neutral points and said external charging-source/load; and at least one electronics controller electrically connected to said charging-sourcing selection socket and said at least one power inverter/converter; whereby the switch legs in each of said inverter/converters selected by said charging-source/load socket collectively function as a single switch leg and said motor/generators function as an inductor;

wherein the external charging source/load is capable of both providing power to the power system and receiving power from the power system based on a selection of the charging-sourcing selection socket.

2. The power system of claim 1 wherein said onboard electrical power generator further comprises an internal combustion engine with a drive shaft having at least one of said motor/generators mechanically coupled to said drive shaft.

3. The power system of claim 1 wherein said onboard electrical power generator is a fuel cell stack electrically connected across said dc bus.

4. The power system of claim 1 wherein said energy storage device is at least one device selected from the group consisting of batteries and ultra-capacitors.

5. The power system of claim 1 wherein said external charging source is at least one source selected from the group consisting of dc power, single phase ac power, and multi phase ac power.

6. The power system of claim 1 wherein said external load is at least one load selected from the group consisting of dc load, single phase ac load, multiphase ac load, and the utility grid.

7. The power system of claim 1 further comprising at least one bidirectional dc-to-dc converter electrically connected across said dc bus.

8. The power system of claim 7 wherein said dc-to-dc converter further comprises two switches electrically connected in series across said dc bus, an inductor with one end electrically connected to the midpoint of said two switches and the other end electrically connected to said energy storage device through a disconnect switch, wherein said midpoint of said two switches is electrically connected to said charging-sourcing selection socket.

9. The power system of claim 1 wherein said capacitor leg further comprises two capacitors electrically connected in series and having a midpoint wherein said midpoint is electrically connected to said charging-sourcing selection socket.

* * * * *